Nov. 9, 1965     J. P. MERTENS     3,216,357

THRUST REVERSAL SYSTEM

Filed April 1, 1960     2 Sheets-Sheet 1

INVENTOR.
JOHN P. MERTENS

BY

ATTORNEYS.

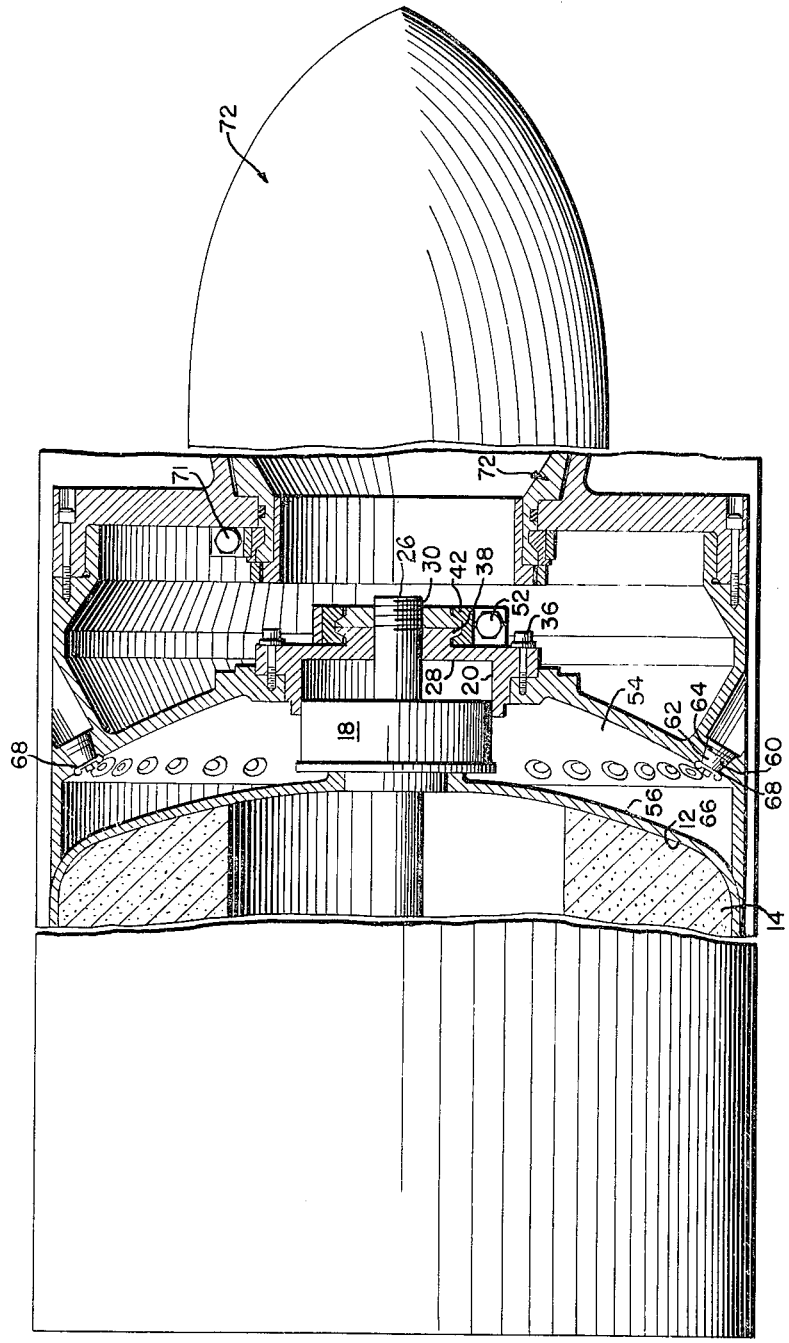

United States Patent Office 3,216,357
Patented Nov. 9, 1965

3,216,357
THRUST REVERSAL SYSTEM
John P. Mertens, Silver Spring, Md., assignor to the United States of America as represented by the Secretary of the Navy
Filed Apr. 1, 1960, Ser. No. 19,431
3 Claims. (Cl. 102—49)
(Granted under Title 35, U.S. Code (1952), sec. 266)

The invention described herein may be manufactured and used by or for the Government of the United States of America for governmental purposes without the payment of any royalties thereon or therefor.

This invention relates to rocket propulsion and more particularly to a reversal thrust of the propulsion motor which may be utilized to separate the motor from the bird.

In the calculation of the flight of a missile it becomes necessary at a certain point in the travel to separate that portion of the missile containing the propulsion medium, from the warhead or bird which contains the destructive medium. This should be accomplished as quickly as possible and without setting up any forces which would influence the remaining flight of the bird. A force acting directly opposite to the propelling force would least disturb the line of flight of the rocket. This force could utilize the propelling force by changing its direction to produce a momentary reversal thrust against the bird and which would separate the bird and the motor. The use of a single vent exhausting through the center against the bird and directly in line with the missile axis has been utilized and in test has imparted a large additional forward acceleration to the bird which cannot be tolerated by the guidance and other components generally contained within the missile. A multiplicity of vents require that all of the vents open simultaneously to effect a separation without imparting a side thrust or torque to the bird which might turn it from it course. Methods which employ blow-off nozzles are unsatisfactory due to re-ignition of the propellant. Complete grain expulsion causes cancellation of the thrust but compromises the design since the whole after-case section must be discarded; also case bonded grains cannot be used, thus restricting the propellant types which can be utilized and if separation of the missile and rocket motor is desirable, the only separation force availabel is aerodynamic drag.

An object of the present invention is to provide a consistent and reliable method of controlling the range of a missile by removing the forward propellant force at a given instant without causing a flight disturbance to be imparted to the missile.

Another object is to provide means for producing a reversal thrust from the burning gases of the propellant which will immediately separate the propulsion unit from the bird without causing any reaction in the bird which would affect its flight by changing its direction or velocity.

Still another object of this invention is the provision of a single valve connecting the motor chamber with a plurality of reversal thrust ports arranged in a circle so that the reversal thrust is exerted evenly and simultaneously throughout the entire 360° of circumference.

A further object of the present invention is to provide individual plugs for each of the plurality of reversal thrust nozzles which will prevent the entrance of fluid from the outside into the motor chamber but which will offer slight or no resistance to a pressure directed against the plugs from inside the chamber.

A still further object of the present invention is to provide a plenum chamber connected to a plurality of reversal thrust ports and to connect the plenum to the propulsion motor chamber by a single piston type valve and to provide means for actuating the piston type valve.

Other objects and many of the attendant advantages of this invention will be readily appreciated as the same becomes better understood by reference to the following detailed description when considered in connection with the accompanying drawing wherein:

FIG. 2 is a cross-sectional view of the motor section and the warhead.

Figure 1:
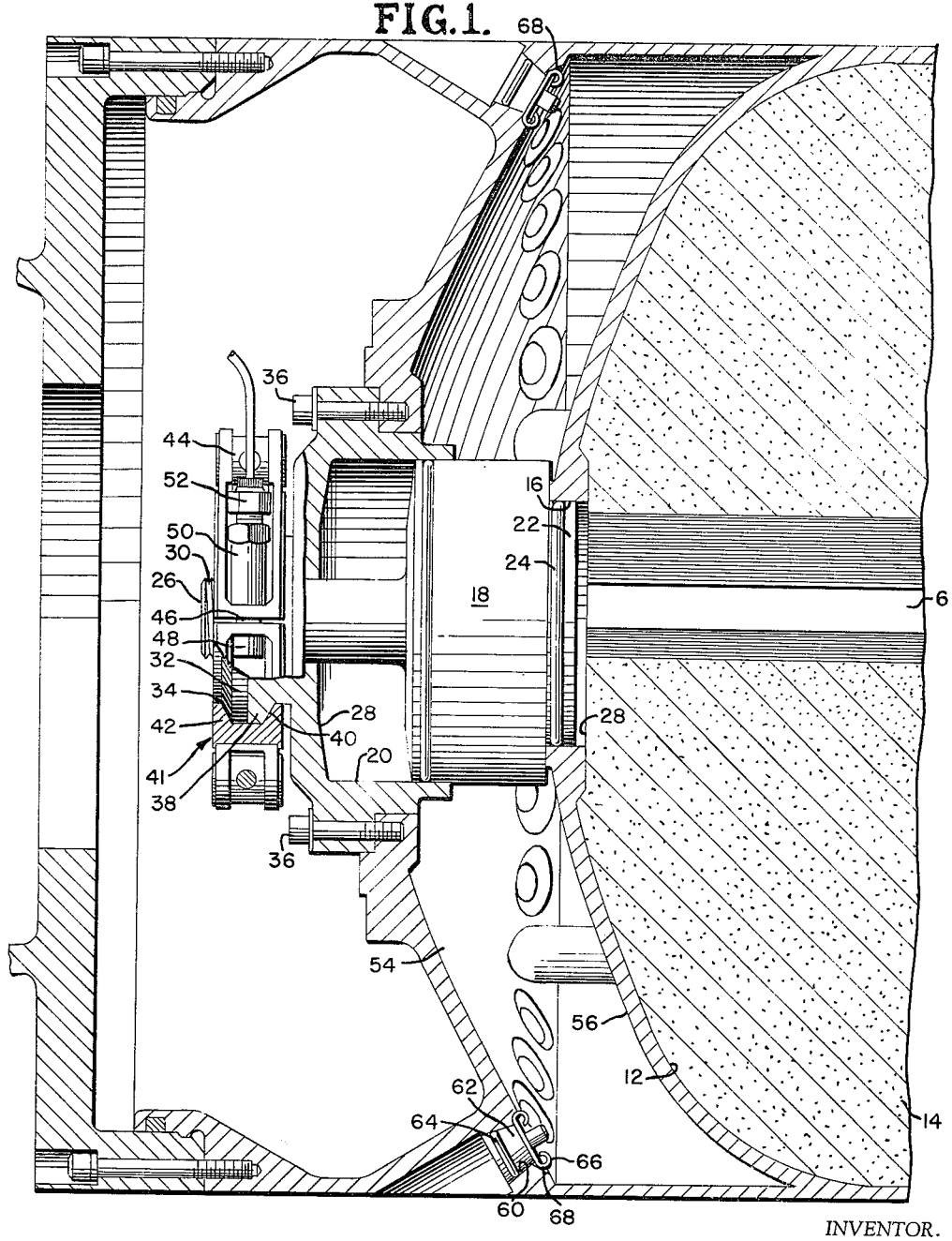
FIG. 1 is a longitudinal cross section of that part of a missile with certain parts omitted to which the invention relates.

The missile which is of the type adapted to be fired from an underwater craft is shown partially (all parts not necessary to an understanding of the invention being omitted). The invention relates particularly to that section of the missile where the fuel chamber is connected to the bird.

The fuel or combustion chamber 12 is of substantial cylindrical form and is filled with the usual solid propellant 14 which is formed preferably with a star shaped center bore and is generally burned from the inside toward the outside. The burning gases serve as the propellant, being directed to a nozzle at the right of the drawing (not shown). At the left or forward end or the end nearest the bird the chamber is formed wih an opening 16 normally closed by a valve.

The valve is of the reciprocating piston type having a large portion 18 housing an igniter mechanism and movable in the cylinder 20, and a smaller portion 22 fitting the opening 16 in the fuel chamber. The piston portion 22 is cylindrical and fitted with an O-ring 24 which effectively seals the opening 16 when the valve is closed which is the position shown in FIG. 1. A shaft 26 preferably formed integral with the piston portions 18 and 22 extends through the end wall 28 of the cylinder 20 and is threaded at 30 to receive the disk 32, which is formed with a frusto-conical surface 34.

The cylinder housing 20 is bolted to the framework of the fuel chamber 12 by the bolts 36 and is formed with an integral collar 38 of a diameter equal to that of the disk 32 and formed with a frusto-conical surface 40, similar to that of disk 32. The disk 32 and collar 38 are initially in contact in base-to-base relation with the conical surfaces tapering away from each other, to provide a separable tapered rim adapted to be held together by a pair of hinged locking members generally designated 41 configured to engage the conical surfaces 34 and 40 and thus lock the piston 18 in the initial position shown. The locking member or band 41 is formed of four locking 90° arcuate shoes 42 having an inner configuration to fit the conical sections of the disk and collar and to present an outer cylindrical surface to a locking chain 44. The locking chain is made up of links which are joined together at the ends thereof by a bolt 46 having a head 48 and a hollow elongated nut 50. The nut is tightened on the bolt to secure the chain and then receives an explosive fitting 52, adapted to split the nut, eject the bolt and loosen the chain so that the pressure of the gas generated by the burning fuel on the piston valve forces the shoes 42 away from the disk and collar permitting movement of the disk away from the collar. Movement of the disk is accompanied by movement of the piston valve from the opening 16 permitting the gases in the fuel chamber to exhaust into the plenum chamber 54, this piston movement being retarded by dash pot action within cylinder 20.

The plenum chamber 54 is a part of the fuel chamber, being separated from the section containing the fuel by the partition wall 56. The plenum chamber 54 is formed with a plurality of ports 58 having tapered valve seats 60. A tapered plug 62 (the drawing illustrates two of the plugs in position) having an O-ring 64 normally seals the ports against the admission of water or air from the outside, while a weak substantially flat spring 66 secured to the inner end of the plug and seated in an annular depression 68 on the inner end of the port normally maintains the plug in position and prevents ordinary vibration from unseating the plug. Upon opening of the fuel chamber into the plenum chamber, the pressure of the burning gases blows all the plugs out through the ports simultaneously, thereby establishing a plurality of open ports substantially circular through which the gases flow to exert a thrust against the forward motion of the rocket. This thrust is exerted forwardly from a plurality of ports completely around the missile and separates the fuel chamber 12 from the bird 72, shown in FIG. 2. The fuel chamber is secured to the missile in a similar manner as that which secures the piston valve so that the firing of an explosive bolt 71 releases the fuel chamber 12 so that it can be separated from the bird 72 by the forward thrust exerted by the explosive gases exhausting through the ports. The fuel chamber attaching and locking means is illustrated in FIG. 2 but forms no part of the present invention. The bird section is locked onto the motor section by a band and an explosive bolt 71. After the band is released, by actuation of the explosive bolt 71 the band falls away and the bird section will be released from the motor section upon actuation of the thrust reversal system. Upon actuation of the explosion bolt 52 in the plenum chamber, the band 41 and arcuate shoes 42 are released and the piston 18 is forced up in the cylindrical housing 20. The hot gases of the motor section force the piston 18 up into housing 20; the hot gases enter into the plenum chamber 54 and exhaust through ports 58 decelerating the motor with respect to the bird section allowing the bird section to continue in a trajectory without the motor section.

Obviously many modifications and variations of the present invention are possible in the light of the above teachings. It is therefore to be understood that within the scope of the appended claims the invention may be practiced otherwise than is specifically described.

What is claimed as new and desired to be secured by Letters Patent of the United States is:

1. A missile comprising a warhead, a fuel chamber detachably connected to said warhead, a first compartment in said fuel chamber for burning an ignitable fuel, said first compartment being formed with a rearwardly directed opening for discharging the gaseous products of the fuel combustion to produce a missile driving thrust, a second compartment in said fuel chamber formed with a plurality of forwardly directed ports, means forming a single opening for communicating the gaseous products of said first compartment with said second compartment, means normally closing said communicating opening comprising a piston valve, and means for initiating the opening of said closing means to establish an outlet for the burning gases through the ports in said second chamber which produce a thrust opposite in direction to the normal missile driving thrust whereby the fuel chamber is decelerated.

2. A missile according to claim 1 wherein the initiating means is an explosive bolt located on a segmented band for restraining the movement of the piston valve.

3. A missile according to claim 1 wherein a holding disk is mounted on the piston valve, a cooperating collar secured to the fuel chamber and normally in abutting relation with said holding disk, chain links engaging both the disk and the collar to normally retain them in contact and prevent movement of the valve, and an explosive bolt normally securing said chain links in engagement with said disk and collar whereby explosion of the bolt releases the chain to permit movement of the valve.

References Cited by the Examiner

UNITED STATES PATENTS

| 2,613,497 | 10/52 | MacDonald | 60—35.6 |
| 2,850,976 | 9/58 | Seifert | 102—49 |
| 2,871,658 | 2/59 | Keck | 60—35.6 |
| 2,945,442 | 7/60 | Adelman et al. | 102—49 |

FOREIGN PATENTS 879,835    12/42    France.

BENJAMIN A. BORCHELT, *Primary Examiner.*

SAMUEL FEINBERG, SAMUEL BOYD, *Examiners.*